United States Patent
Bagdasar

[15] 3,654,712
[45] Apr. 11, 1972

[54] TEACHING AID KIT

[72] Inventor: Florica Bagdasar, 5901 N. Sheridan Rd., Apt. 13-A, Chicago, Ill. 60626

[22] Filed: Dec. 31, 1969

[21] Appl. No.: 889,559

[52] U.S. Cl. ..................................35/73, 35/35 H, 35/71
[51] Int. Cl. .................................................G09b 1/06
[58] Field of Search ..................35/35 R, 35 D, 35 H, 35 J, 35/71, 73, 60; 283/46; 273/136 W

[56] References Cited

UNITED STATES PATENTS

| 1,732,980 | 10/1929 | Mooney | 35/355 X |
| 218,306 | 8/1879 | McNeill | 35/73 |
| 1,013,856 | 1/1912 | Arnett | 35/73 |
| 1,323,779 | 12/1919 | McDade | 35/73 |
| 1,479,423 | 1/1924 | Barton | 35/73 |
| 1,857,009 | 5/1932 | Amor | 35/73 |
| 1,904,723 | 4/1933 | Fisher | 35/73 |
| 2,635,360 | 4/1953 | Bishop | 35/73 |
| 2,782,038 | 2/1957 | Engel | 35/35 H X |
| 2,982,031 | 5/1961 | Bardelli | 35/73 |

FOREIGN PATENTS OR APPLICATIONS

| 571,571 | 2/1924 | France | 35/35 H |
| 744,114 | 1/1933 | France | 35/73 |
| 569,156 | 5/1945 | Great Britain | 35/71 |

OTHER PUBLICATIONS

Sargent, " Table of Periodic Properties of the Elements" and " Periodic Table of the Elements," copyright 1964

*Primary Examiner*—Harland S. Skogquist
*Attorney*—Greist, Lockwood, Greenawalt & Dewey

[57] ABSTRACT

The kit includes a plurality of groups of cards with each card having a letter of the alphabet marked thereon. Each card in each group (e.g., five cards per group) has an upper case letter form marked on a first surface thereof and a lower case letter form marked on a second surface thereof. The kit also includes a container having a plurality of compartments, one for each group of cards, and a tray on which various cards can be assembled to form different combinations of letters and words. The kit also includes an alphabet learning tablet having a first side and a second side. The first side has a plurality of enclosures thereon, the number of enclosures being equal to the number of letters of the alphabet. Each of the enclosures has the printed and cursive forms of an upper case letter and a lower case letter within the enclosure. The letters are arranged in alphabetical sequence with a different letter of the alphabet in each enclosure. The second side of the tablet has a plurality of graphic enclosures thereon and each of the graphic enclosures has a picture of an article or thing and the word for the article within the enclosure. The first letter of each word is a different letter of the alphabet and the words are arranged so that the first letter of each word is in alphabetical sequence with respect to the first letter of the word in an adjacent graphic enclosure. Additionally, the kit includes a card for each letter of the alphabet which has the printed and cursive forms of an upper case and a lower case letter on a first surface thereof identical to the letter forms in one of the enclosures on the first side of the tablet and a picture of an article or thing and a word for the article on the second surface of the card identical to the picture and word in one of the graphic enclosures on the second side of the tablet.

12 Claims, 10 Drawing Figures

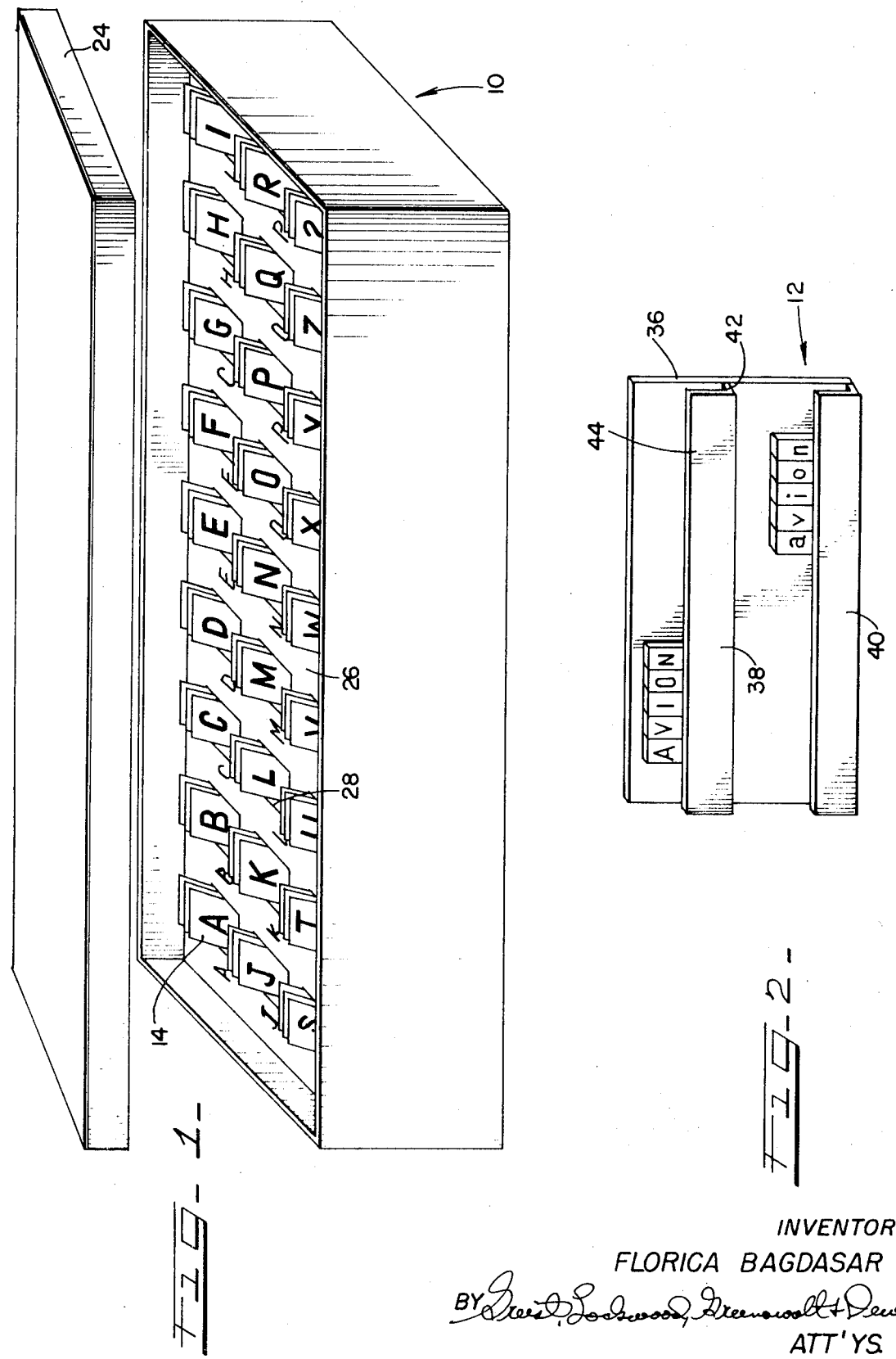

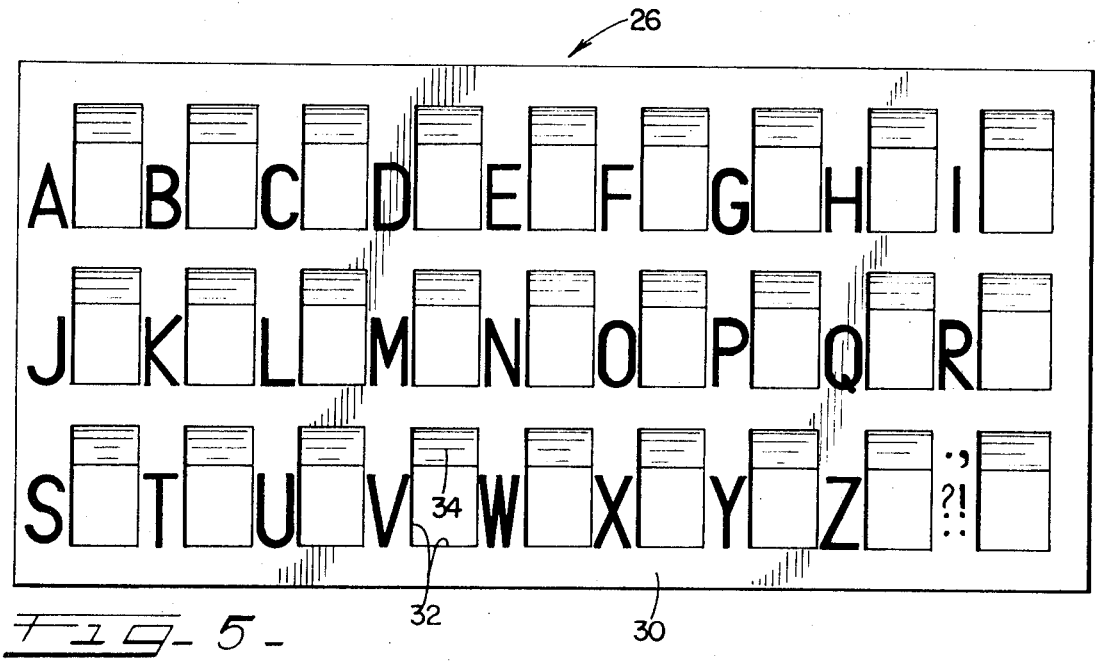
Fig-5-
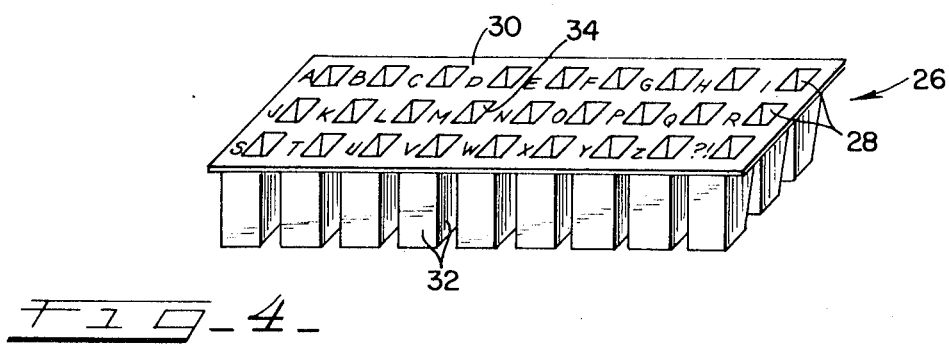
Fig-4-
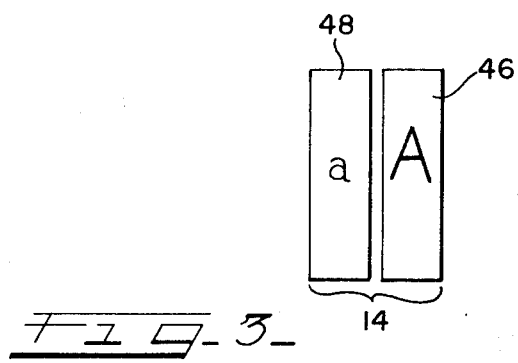
Fig-3-
INVENTOR
FLORICA BAGDASAR
BY
ATT'YS.

INVENTOR
FLORICA BAGDASAR
ATT'YS.

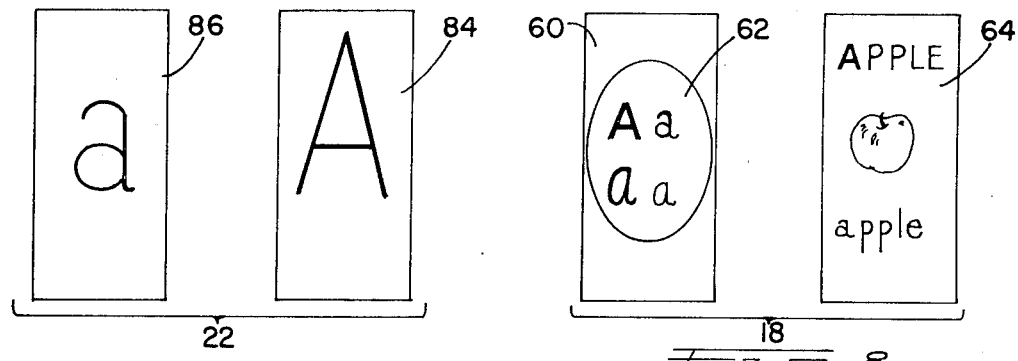
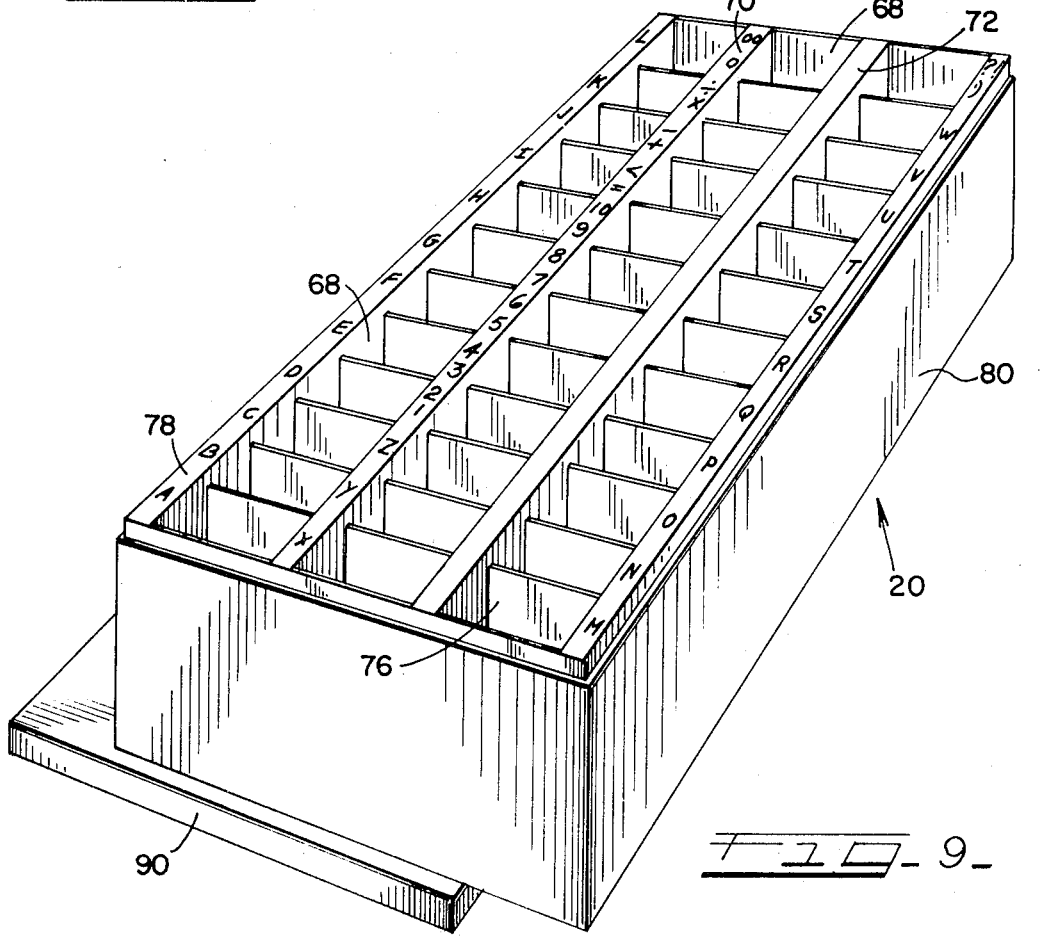

TEACHING AID KIT

The present invention relates to a teaching aid kit particularly adapted for use in kindergarten and/or first grade of an elementary school for teaching the alphabet, spelling and sentences and if desired, numbers and arithmetic. More specifically, the present invention provides a kit which a young student can carry with him for use both at home and at his desk in the classroom. Additionally, the present invention includes a kit, somewhat similar to the student's kit, except with larger pieces, for use by the teacher at the front of the classroom.

The teacher's kit and the student's kit include similar groups of cards with letters of the alphabet thereon. The letter cards are different only in size, with the cards in the teacher's kit being larger. The student's kit also includes a tray on which the student can horizontally assemble different combinations of letters and words. The tray enables the student to show the teacher what he has done merely by lifting his tray and holding it vertically.

The teacher's kit can include a similar, but larger, tray vertically positioned at the front of the classroom for easy viewing by the students. In this way, each student can assemble on his individual tray the same combination of letters which the teacher has assembled on the larger tray at the front of the classroom; and the teacher can obtain immediate feedback from the students by asking them to raise their trays to see what they have done.

The student's kit can also include one or more alphabet learning tablets, each tablet having the printed and cursive forms of the upper and lower case letters of the alphabet marked on one side of the tablet in alphabetical order. On the other side of the tablet are three rows of pictures and words. Each picture is of an article or thing, the word for which begins with a different letter of the alphabet and the word for each article or thing is marked on the tablet next to the article or thing having that word. Additionally, the words are arranged so that the first letter of each word is in alphabetical order or sequence with respect to the first letter of an adjacent word.

The student's kit may also include a letter card for each letter of the alphabet, each card having the printed and cursive letter forms of an upper and a lower case letter on a first surface thereof identical to the letter forms shown on one side of the tablet, and a picture and word on the second surface thereof identical thereof to a picture and word shown on the other side of the tablet.

It will be understood that a student teaching aid kit including the elements described above, will enable a student to perform many learning exercises with his kit either at home or at his desk in the classroom.

Accordingly, a general object of the present invention is the provision of a teaching kit for use in kindergarten and/or first grade which includes a group of cards for each letter of the alphabet, a container having a compartment for each group of cards and a tray for assembling and displaying an arrangement of letter cards which form diverse combinations of letters and words.

Another object of the present invention is the provision of an individual teaching aid kit for each student in a classroom and an individual teaching aid kit for the teacher, each kit including a group of cards for each letter of the alphabet and each card in each group having the upper case letter form marked on one face thereof and the lower case letter form marked on the other face thereof, the kit also including a container having a compartment for each group of letter cards and a tray for assembling and displaying diverse combinations of letter cards.

Another object of the present invention is the provision of a teaching aid kit which is easy to handle by a student and offers the student the possibility for many exercises including phonetic, vocabulary and grammar exercises.

Another object of the present invention is the provision of a teaching aid kit which enables the student to go through learning exercises in which he is actively associating sound with letters.

Another object of the present invention is the provision of a teaching aid kit which includes an alphabet learning tablet having the alphabet displayed in sequential order and in four forms of each letter on one side of the tablet and pictures of articles or things and the words for same displayed on the other side, each word beginning with a different letter and letter sound corresponding to the sounds of the letters displayed on the first mentioned side of the tablet.

Another object of the present invention is the provision of a teaching aid kit which includes an alphabet learning tablet having a charte of the entire alphabet in sequential order on one side thereof, a set of letter cards including at least one card for each letter of the alphabet, and a letter box having a compartment for each letter of the alphabet, the letters on the chart and the letter cards in the letter box being arranged in the same order to help the student develop a kinetic topographical memory of the alphabet.

Another object of the present invention is the provision of a teaching aid kit which a student can carry with him for use in the classroom or at home.

Another object of the present invention is the provision of a teaching aid kit which includes a plurality of cards having letters thereon and a tray for assembling different letters to form diverse combinations of letters or words, the tray enabling the student to hold up his assembly of letters for the teacher and/or the class to see.

Another object of the present invention is the provision of individual teaching aid kits for each student in a classroom and a similar, but larger kit for the teacher, the kits having similar letter cards so that each student can imitate or copy the letter card exercises performed by the teacher enabling the teacher to obtain immediate feedback from her entire class of students.

Another object of the present invention is the provision of an individual teaching aid kit for each student in the class room so that students with various abilities may work with the same materials at the same time, each student working at his own speed.

Another object of the present invention is the provision of a teaching aid kit including a plurality of letter cards with some cards having letters marked thereon in one color and other cards having letters marked thereon in a different color so that parts, e.g., syllables, of words formed by assembling the cards in a predetermined manner can be accentuated or emphasized.

Still another object of the present invention is the provision of an individual teaching aid kit for a teacher, which includes arithmetic materials, such as cards having the numerals 1–10 thereon, some cards with mathematical symbols thereon, and sets of cards having one or two discs in different colors thereon, as well as letter cards, so that mathematical as well as spelling materials are at the teacher's fingertips.

These and other objects of the present invention and the manner of their attainment will become more apparent from the following detailed description of the preferred embodiments of the present invention wherein:

FIG. 1 is a perspective view of a letter card box of the teaching aid kit of the present invention;

FIG. 2 is a perspective view of the letter tray of the teaching aid kit of the present invention;

FIG. 3 is a side elevational view of opposite faces of one of the letter cards of the teaching aid kit of the present invention;

FIG. 4 is a perspective view of the compartment shell module which is received in the letter box shown in FIG. 1;

FIG. 5 is a top plan view of the compartment shell module shown in FIG. 4;

FIG. 6 is a plan view of one side of the alphabet learning tablet of the teaching aid kit of the present invention;

FIG. 7 is a plan view of the other side of the alphabet learning tablet shown in FIG. 6;

FIG. 8 is a side elevational view of opposite faces of one of the cards utilized with the alphabet learning tablet shown in FIG. 6;

FIG. 9 is a perspective view of a teacher's letter and numeral card box of the teaching aid kit of the present invention; and, FIG. 10 is a side elevational view of opposite faces of one of the letter cards which is received in one of the compartments in the letter and numeral card box shown in FIG. 9.

Referring now to the drawings in greater detail, the teaching aid kit of the present invention encompasses an individual kit for each student in a classroom and an individual kit for the teacher.

Each student's kit includes a letter card box or container 10 as best shown in FIG. 1, a tray 12 as best shown in FIG. 2 and a group of letter cards for each letter of the alphabet, such as the card 14 shown in detail in FIG. 3.

Figures 6, 7:
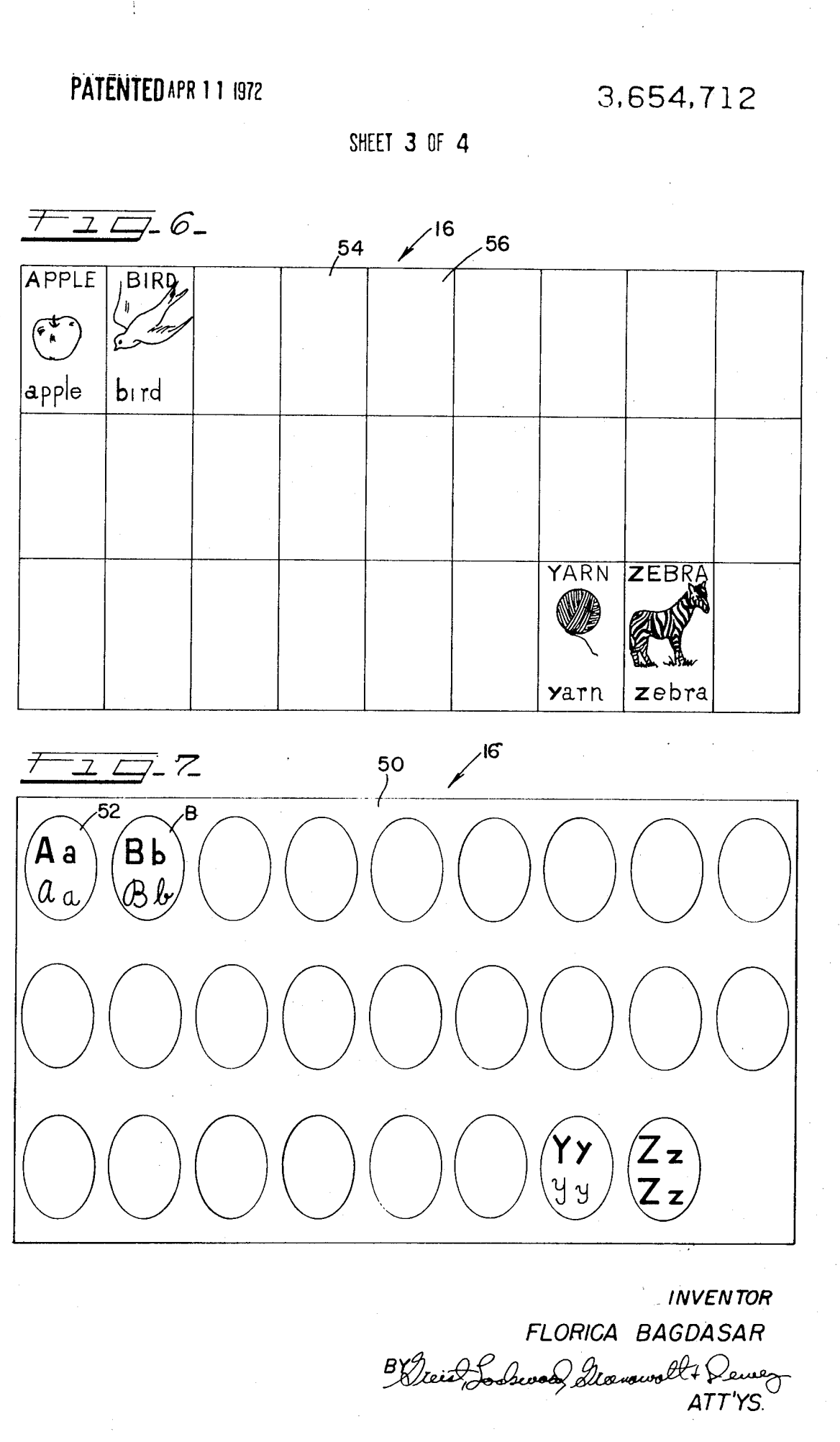

The student's kit can also include at least one alphabet learning tablet 16 shown in FIGS. 6 and 7 and a plurality of cards for use with the tablet 16 such as the card 18 shown in detail in FIG. 8.

The teacher's kit includes a teacher's letter and numeral card box or container 20 as shown in FIG. 9, and a plurality of groups of letter and numeral cards, such as the card 22 shown in FIG. 10, which are received and stored in the box 20.

Referring again to FIG. 1, the student's kit also includes a cover 24 for the letter card box 10 and a compartment shell module 26 which is received in the box 10 and which has individual compartments 28 for receiving and storing each group of letter cards 14. As shown, the compartment shell module 26 has twenty seven (27) compartments arranged in three rows with nine compartments in each row. The first twenty six (26) compartments 28 are adapted to receive letter cards 14 having the various letters of the alphabet thereon and the twenty-seventh (27th) compartment 28 is adapted to receive a group of cards having punctuation marks thereon.

As best shown in FIG. 4, the compartment shell module 26 is of one piece construction and can be formed by a suitable mold or die or can be punched out (extruded). As such, the compartment shell module 26 includes a top panel portion 30 which interconnects the compartments 28. Preferably, the compartment shell module 26 is formed from a lightweight semi-rigid material such as a plastic material to minimize the weight of the teaching kit.

As best shown in FIG. 5, the top panel portion 30 is of sufficient size so that letters of the alphabet can be marked or otherwise imprinted thereon adjacent each one of the compartments 28 to identify the respective compartment in which each group of cards 14 is received and stored. Preferably, the top panel portion 30 will have a light colored surface and the letters and punctuation marks thereon will be a darker color so that they will stand out clearly.

As shown in FIGS. 4 and 5, the compartments 28 are in the form of cavities having vertical side wall portions 32 and one inclined side wall portion 34. The inclined side wall portion 34 of each compartment 28 serves as a seating surface for the group of cards received in that compartment 28 such that the group of cards are in an inclined stack with the top card of the stack facing slightly upwardly to better display the letter marked thereon, as shown in FIG. 1.

As best shown in FIG. 2, the tray 12 includes a plate 36 having two racks 38 and 40 mounted thereon. Since the rack 40 is identical to the rack 38, only the rack 38 will be described in detail. As shown, the rack 38 includes a ledge portion 42 and a raised edge or curb portion 44. The ledge portion 42 extends outwardly from the plane of the plate 36 and the raised edge portion 44 extends from the ledge portion 42 parallel to the plane of the plate 36. In this way, the ledge portion 42 of the rack 38 forms a bottom seat for a card received in the pack 38 and the raised edge portion 44 forms a retaining wall for retaining the cards received in the rack 38 against the plate 36. Also tray 12 is made from relatively rigid material such as a plastic or heavy paperboard material. With this construction of the tray 12, a student can easily assemble diverse combinations of letters and/or words on the racks 38 and 40 while the tray 12 is situated in a horizontal position and then lift and hold the tray in a vertical position to display the combinations of letters or words he has formed on his tray 12, with the racks 38 and 40 preventing the letters from falling off of the tray 12.

It will be understood that this embodiment of the teaching aid kit of the present invention includes a plurality of groups of letter cards 14, one group for each letter of the alphabet. By way of example, one teaching aid kit of the present invention includes five letter cards in each group of cards. Each one of the cards 14 has a first face or surface 46 and a second face or surface 48. An upper case or capital letter form of one letter of the alphabet is marked on the first surface 46 of each card in each letter group and a lower case or small letter form of that letter of the alphabet is marked on the opposite second surface 48 of each card in each letter group as best shown in FIG. 3. In this way, the teaching aid kit enables the young student to learn capital and small letters to prepare him for the spelling of proper nouns and sentences.

In addition to the letter cards 14, the teaching aid kit can also include punctuation cards which are received in the twenty-seventh (27th) compartment 28. By way of example, one teaching aid kit of the present invention included five punctuation cards. Three of the cards had a period on the first surface 46 of each card and a comma on the second surface 48 of each card and two of the cards had a question mark on the first surface 46 thereof and an exclamation mark on the second surface 48 thereof.

In one embodiment of the invention, the cards were made of lightweight semi-rigid material (e.g., a plastic or paperboard material) and were ½ inch wide by 1 ½ inches long and one-sixteenth inch thick.

As shown in FIG. 7, the first side 50 of the alphabet learning tablet 16 has a plurality of enclosures 52 in the form of ovals. The plurality of ovals 52 are arranged in three rows, nine ovals in each of the first two rows and eight ovals in the third row. Each one of the first twenty-six (26) ovals 52 has a printed and cursive form of an upper (capital) and lower (small) case letter of the alphabet. For example, the first oval 52 at the upper left hand corner of the first side 50 of the table 16 has the printed form of capital "A" and small "a" in the upper half of the oval 52 and the cursive form of capital "A" and small "a" in the lower half of the oval 52. The next adjacent oval has the printed and cursive form of the upper and lower case letter "B" within the oval 52. In like manner, the succeeding ovals 52 will have succeeding letters of the alphabet in the printed and cursive letter forms and in the upper and lower case letter forms. Preferably, the printed form of the letters in the ovals 52 are black in color and the cursive form of the letters are red in color, with the first side 50 of the tablet 16 being a neutral color such as white, so that the printed and cursive forms are distinguishable from one another by color as well as by form.

As best shown in FIG. 6, the second side 54 of the alphabet learning tablet 16 has at least twenty-six (26) graphic enclosures 56 thereon in the form of rectangles and each of the graphic enclosures 56 includes a picture of an article or thing and the word for the article within the graphic enclosure 56. Preferably, and as shown, two forms of the word for the one article are contained with each enclosure 56 with capital letters and is situated at the top of the enclosure 56 and the other form is with small letters and is situated at the bottom of the enclosure 56. The first letter of each word in each of the graphic enclosures 56 is a different letter of the alphabet and the beginning sound of each word is the letter sound of the first letter of the word. For example, the first graphic enclosure 56 at the upper left hand corner of the second side 54 of the alphabet learning tablet 16 has therein a picture of an apple and the word "APPLE" at the top and the word "apple" at the bottom. It will be understood that the first letter of each of the words in each of the succeeding graphic enclosures 56 begins with a different letter of the alphabet and the words are arranged in the respective graphic enclosures 56 so that the first letter of each word in each enclosure is in alphabetical sequence with respect to the first letter of the word in an adjacent graphic enclosure. For example, the second graphic enclosure 56 has a picture of a bird and the words "BIRD" and "bird" therein.

It will be understood that the arrangement of the letters in alphabetical order in the ovals 52 on the first side 50 of the alphabet learning tablet 16 assists the student in developing a kinetic topographical memory of the letters of the alphabet and the various forms of the letters of the alphabet.

On the other hand, the second side 54 of the alphabet learning tablet 16 provides the student with clue pictures and words for the sounds of the letters of the alphabet. Also, the alphabetical order on the first side 50 is reinforced by arranging the words on the second side 54 so that the first letter of each word is in alphabetical sequence with respect to he first letter of the adjacent word.

In one embodiment of the invention, the tablet 16 measures approximately 14½ inches by 8½ inches. A tablet 16 of this size conveniently fits on the student's desk and each tablet 16, if the kit includes more than one tablet 16, is within the scope of the visual capability of the student. Preferably, the table 16 is formed from a relatively rigid material, such as a heavy paperboard or plastic material, so that the tablet is very durable for withstanding the normal wear to be expected from a child's use of the tablet 16.

Preferably, a teaching kit of the present invention which includes an alphabet learning tablet 16 as shown in FIG. 6 and 7 also includes a set of cards for use with the tablet 16. The set of cards includes one card for each letter of the alphabet, such as the card 18 shown in FIG. 8. The first face or surface 60 of each one of the cards 18 has an oval 62 with the printed and cursive forms of an upper and lower case letter of the alphabet thereon identical to the letters in one of the ovals 52 on the first side 50 of the tablet 16 shown in FIG. 6. In like manner, the other side 64 of each card 18 has a picture of an article or thing and the word(s) for the article thereon identical to the picture and word(s) in one of the graphic enclosures 56 on the second side 54 of the tablet 16 shown in FIG. 7. It will be understood that the set of cards 18 helps the student recognize, identify and learn the words and letters on the tablet 16 by enabling him to match one side 60 and 64 of one of the cards 18 with one of the enclosures 52 or 56.

In one embodiment of the present invention, each card is 1½ inches wide x 2½ inches long so that it is sufficiently large for the student to match up one side 60 or 64 thereof with one of the enclosures 52, 56 on a corresponding tablet 16. Also, each set of cards 18 has a separate container and is not stored in the letter box 10.

It will be understood that where the teaching aid kit of the present invention includes more than one tablet 16 each tablet has a different set of pictures on the second side 52 thereof and a different set of cards 18 is provided for use with each tablet 16, each set having cards with pictures and words identical to the pictures and words on the corresponding tablet 16. In one embodiment of the present invention the teaching aid kit includes three tablets 16 and three sets of cards 18, each tablet being made from a different color stock, e.g., white, yellow and pink.

The alphabet learning tablet 16 and associated sets of cards 18 are very useful in the initial teaching of the alphabet and are usually introduced first to the student. In this respect, the tablet(s) 16 or the tablet(s) 16 and set(s) of cards 18 can be considered as an individual kit in addition to being part of a larger kit which includes the letter bar 10, the tray 12 and the groups of cards 14.

Referring now to FIG. 9, the teacher's teaching aid kit includes the letter and numeral card box 20 and a plurality of groups of cards, such as the card 22 shown in FIG. 10. As shown, the letter box 20 includes 36 compartments 68 for receiving and storing thirty-six (36) groups of cards. The compartments are formed by two long partitions 70 and 72 which extend across the length of the box 20 and a plurality of short partitions 76 which extend across the width of the box 20. The partitions 70 and 72 as well as the longitudinal side walls 78 and 80 of the letter and numeral card box 20 have sufficient width so that a letter, numeral or other symbol can be marked on the top surface thereof adjacent one of the compartments 68 to identify the respective compartment 68 in which each group of cards 22 is received and stored.

In one embodiment of the invention 26 of the compartments 68 contains letter cards, one compartment 68 contains punctuation cards, five compartments 68 contains numeral cards, two compartments 68 contains mathematical symbol cards, one compartment 68 contains cards with one disc thereon and one compartment 68 contains cards with two discs thereon.

In this embodiment, each letter card compartment 68 contains eight letter cards with each letter card having the capital or upper case letter form on a first face or surface 84 thereof and a small or lower case letter form on a second face or surface 86 thereof as shown in FIG. 10. Preferably, five cards are printed in black and three in red so that the teacher can form a word with different colored letters to emphasize different parts (e.g., syllables) of the word.

One compartment 68 contains eight punctuation cards. Although not shown, it will be understood that five of the punctuation cards have a period on the first surface 84 thereof and a comma on the second surface 86 thereof whereas three of the punctuation cards have a question mark on the first surface 84 thereof and an exclamation mark on the second surface thereof.

Five of the compartments 68 contain groups of numeral cards for the numbers 1-10, each compartment containing two groups of numeral cards. Each group contains four cards having the same number printed in black on both sides thereof.

Two of the compartments 68 contain three groups of mathematical symbol cards. Although not shown, it will be understood that each group has four cards, the cards of the first group having a plus sign on the first surface 84 thereof and a minus sign on the second surface 86 thereof, the cards of the second group having a multiplication sign on the first surface 84 thereof and a division sign on the second surface 86 thereof, and the third group of cards having an equal sign on the first surface 84 thereof and a greater-less sign on the second surface 86 thereof.

One compartment 68 contains ten cards having one red disc printed on the first surface 84 thereof and one blue disc printed on the second surface 86 thereof.

The last compartment 68 contains ten cards with two red discs printed on the first surface 84 thereof and two blue discs printed on the second surface 86 thereof.

The discs printed on the cards contained in the last two mentioned compartments are all of the same size. Also, all of the numeral and letter cards 22 are of the same size. In this respect, in one embodiment of the invention each card 22 measures 5½ inches long and 2⅜ inches wide so that the letter or marking thereon is sufficiently large to be recognized when viewed from a distance, and the box 20 measures 12¾ inches long, 10½ inches wide and 6 inches deep.

As shown in FIG. 9, the letter box 20 is provided with a cover 90. Also, although not shown, the teacher's teaching aid kit can include a tray similar to the tray 12 but of sufficient size to receive and hold the cards 22. With such a tray in a vertical position at the front of the classroom, the teacher can display different combinations of letter cards and numeral cards for teaching, spelling, reading and sentences as well as numbers and mathematics.

The materials of the student's teaching aid kit and the teacher's teaching aid kit are very useful in the initial teaching of the letters of the alphabet and the numbers of the base 10 decimal system to children (e.g., in kindergarten and first grade). Also, the materials of each kit can be utilized in the more sophisticated task of forming words and sentences. As such, it will be readily appreciated that the variety of exercises which can be performed with the teaching aid kits of the present invention is limited only by the imagination of the teacher.

As is well known in the field of education, a child's first test is one of discovery. He matches pictures with pictures, letters with letters, beginning sound of a word with a letter and ending sound of a word with a letter. With this in mind, the materials of the teaching aid kits of the present invention can be used for various kinetic exercises in associating sounds with letters and in this way, help the young student build his vocabulary. For example, with a teaching aid kit including three alphabet learning tablets 16, a child has the opportunity to learn the 78 vocabulary words on the tablets 16 as well as the letters of the alphabet.

Moreover, games involving sequential order may be introduced by the teacher. Such game exercises will utilize the alphabet learning tablet 16 together with the cards 18, and these learning materials will prepare the child for the use of the letter cards 14 and the assembly of these letter cards 14 on the tray 12. In this way, the student will soon be able to form words and sentences using his letter cards 14 and letter tray 12. By actually constructing words and sentences with isolated letters the student is aware of the correct configuration of each letter and the correct spelling of each word.

With the materials of the teacher's teaching aid kit, the teacher is able to show the children the different letters of the alphabet and construct words and sentences in their correct form. Moreover, each child with his own teaching aid kit, can work along with the teacher by using his own letter cards and letter tray. In this way, he has complete control over his work and can easily correct himself by looking at the teacher's example.

By using the colored letters, the teacher can emphasize the syllables of a word. Additionally, the teacher can show how a word can be changed by showing these changes in contrasting colors.

Accordingly, the teaching aid kits of the present invention have many advantageous features. By way of example, some of these features are listed below:

1. The materials of each kit are easy to handle and offer the student the possibility for performing many exercises, e.g., phonetic, vocabulary and grammar. Through these exercises the student is actively associating sound with letters.
2. With the tablet 16, a child sees the entire alphabet in sequential order and the four various forms of each letter. Additionally, he has "clue" pictures for the sounds of letters.
3. Because of the identical arrangement of the letters on the tablet 16 and of the letters on the panel portion 30 in the letter card box, a child can easily develop a kinetic topographical memory of the alphabet.
4. The letter cards 14 are easy to find and easy to put away properly.
5. The materials may be used in the classroom or at home. In the classroom the student is able to respond at once by use of the picture/letter cards 18 with his tablet 16 or by holding up his letter tray 12 with a combination of letter cards 14 thereon. Everyone in the class participates equally and the teacher can obtain immediate feedback from her entire class by merely asking them to hold up their letter trays 12.
6. Children of various ability levels can work with the same materials at the same time and need not be aware of the complexity of their task.
7. Use of the cursive letter form of the alphabet which is a simplified version of the written or manuscript form of the alphabet letter helps a student progress from the printed form to the written form of the letters of the alphabet.
8. The inclusion of basic arithmetic materials (numeral cards for the numbers 1-10, mathematical symbol cards and sets of cards having one or two discs (dots) in blue and red color) in the teacher's kit places reading and mathematics materials at her fingertips.

I claim:

1. A teaching aid kit particularly adapted for use in kindergarten and/or first grade for learning reading writing, and arithmetic, said kit comprising at least one student's kit and a teacher's kit, said student's kit including a plurality of groups of cards, at least one group for each letter of the alphabet, each of said cards in each of said groups for each letter of the alphabet having an upper case letter form on one face thereof and a lower case letter form on the reverse face thereof, a compact container sized to take up only a small portion of the space on a students desk and having 27 compartments therein arranged in three rows, nine compartments per row, for storing in alphabetical sequence each group of cards, said plurality of groups of cards including one group of punctuation cards which are stored in the twenty seventh compartment of said container, a removable cover for said container, a separate tray for assembling cards from different groups of said cards to form different combinations of letters and words, said tray including a rigid sheet of material having at least one rack mounted thereon and adapted to hold a plurality of said cards, said tray being sized to fit within said container above said compartments and beneath said cover, at least one alphabet learning tablet having a plurality of enclosures on one side thereof arranged in three rows with each enclosure of the first 26 enclosures having therein the printed capital and lower case forms and the cursive capital and lower case forms of one letter of the alphabet and with said enclosures of letter forms arranged in alphabetical sequence, said tablet also having a plurality of graphic enclosures on the reverse side thereof which are arranged in three rows with each enclosure of the first twenty six enclosures having a picture of an object and the word for said object therein, the first letter of each word being a different letter of the alphabet and said words being arranged in alphabetical sequence with respect to said first letters thereof, and a plurality of cards at least one each for each of said first 26 enclosures on said one side of said tablet, each card having on one face thereof the letter forms appearing in one of said enclosures and having on the reverse face thereof the picture of an object and the word for the object as appears in one of said graphic enclosures, the first letter of said word on said card being the same letter which appears on the one face of said card, and said teacher's kit including a box with 36 compartments, a cover for said box, 36 groups of cards, larger than said cards of said students kit, adapted to be received and stored in said 36 compartments, each card in each of the first 26 groups of cards having a letter of the alphabet in capital form on one face thereof and in lower case form on the reverse face thereof, some of the cards in each group having the letters thereon in one color with the remaining cards in each group having the letters thereon in another color, the ten remaining groups of cards including at least one group of punctuation cards having punctuation marks thereon, several groups of number cards having numerals thereon, at least one group of symbol cards having arithmetic symbols thereon, and at least one group of cards with sets of discs thereon in two different colors for graphically showing mathematical relationships between various groups of discs, and a tray substantially larger than said tray of said students kit, said tray being adapted to be mounted on a wall for displaying different combinations of words, letters or numbers to a group of students, and said letters or markings on each of said cards being of sufficient size so as to be easily recognized when viewed from a distance such as from the back row of a conventional classroom.

2. A teaching aid kit particularly adapted for use in kindergarten and/or first grade for teaching reading and writing, said kit comprising a plurality of groups of cards, at least one group for each letter of the alphabet, each of said cards in each of said groups for each letter of the alphabet having an upper case letter form on one face thereof and a lower case letter form on the reverse face thereof, a compact container sized to take up only a small portion of the space on a student's desk and having individual compartments for storing each group of cards, a removable cover for said container, and a separate tray for assembling cards from different groups of said cards to form different combinations of letters and words, said tray including a rigid sheet of material having at least one rack mounted thereon and adapted to hold a plurality of said cards, and said tray being sized to fit within said container above said compartments and beneath said cover whereby said kit can be easily carried by a student for use at home and in the classroom.

3. A teaching aid kit as defined in claim 2 wherein the letters on some of the cards in at least one of said groups are of one color and the letters on the remaining cards in said group are of another color.

4. A teaching aid kit as defined in claim 2 wherein said rack includes a ledge portion which extends outwardly from the plane of said sheet of material and a raised curb portion which extends a short distance from said ledge portion in generally parallel spaced relationship to said plane of said sheet material.

5. A teaching aid kit as defined in claim 2 including an alphabet learning tablet having a first side and a reverse side, said first side of said learning tablet having a plurality of enclosures which are equal in number to the letters of the alphabet and which are arranged in three rows, each of said enclosures having therein the printed and cursive upper and lower case forms of a letter of the alphabet, said letters being arranged in alphabetical sequence, and said reverse side having a plurality of graphic enclosures which are equal in number to the number of letters in the alphabet and which are arranged in three rows, each of said graphic enclosures on said reverse side of said tablet including a picture of an object and the word for said object, the first letter of each of said words being a different letter of the alphabet and said words being arranged in each of said graphic enclosures so that the first letter of said word in each of said graphic enclosures is in alphabetical sequence with respect to the first letter of said word in an adjacent graphic enclosure.

6. A teaching aid kit as defined in claim 5 including a plurality of cards equal in number to the number of enclosures on said first side of said tablet, each of said cards having printed and cursive forms of the upper and lower case letters on one face thereof identical to the letters shown in one of said enclosures on said first side of said tablet and having a picture of an object and the word for said object on the reverse face thereof identical to said picture and word in one of said enclosures on said reverse side of said tablet, the first letter of said word on said card being the same as the letter appearing on said one face of said card.

7. A teaching aid kit as defined in claim 2 wherein said compartments are twenty seven in number and are arranged in three rows with nine compartments in each row.

8. A teaching aid kit as defined in claim 7 wherein the first 26 compartments are adapted to store in alphabetical sequence said groups of cards having the letters of the alphabet, said plurality of groups including one group of cards having punctuation marks thereon, and said 27th compartment is adapted to receive and store said one group of cards having punctuation marks thereon.

9. A teaching aid kit as defined in claim 8 wherein said group of punctuation cards includes first and second subgroups, said first subgroup having cards with a period on one face of each card and a comma on the reverse face of each card, and said second subgroup having cards with a question mark on one face of each card and an exclamation mark on the reverse face of each card.

10. A teaching aid kit as defined in claim 2 wherein said container includes a box and a one piece compartment shell module having a panel portion and a plurality of pocket shaped compartments therein.

11. A teaching aid kit as defined in claim 10 wherein said compartments are spaced apart a sufficient distance to provide space on said panel around and adjacent said compartments for the marking of letters of the alphabet on said panel portion adjacent respective ones of said compartments.

12. A teaching aid kit as defined in claim 10 wherein each of said compartments is defined by generally vertical side wall portions and one inclined side wall portion which serves as an inclined seating surface for said group of cards received in said compartment.

* * * * *